US010008040B2

(12) United States Patent
Lam et al.

(10) Patent No.: US 10,008,040 B2
(45) Date of Patent: Jun. 26, 2018

(54) METHOD AND SYSTEM FOR VIRTUAL SHOES FITTING

(71) Applicants: OnePersonalization Limited, Hong Kong (HK); Hong Kong Productivity Council, Hong Kong (HK)

(72) Inventors: Pong Yuen Lam, Hong Kong (HK); Chin Lok Poon, Hong Kong (HK); Sin Yu Fung, Hong Kong (HK)

(73) Assignees: OnePersonalization Limited, Hong Kong (HK); Hong Kong Productivity Council, Hong Kong (HK)

( * ) Notice: Subject to any disclaimer, the term of this patent is extended or adjusted under 35 U.S.C. 154(b) by 105 days.

(21) Appl. No.: 15/223,015

(22) Filed: Jul. 29, 2016

(65) Prior Publication Data

US 2018/0033202 A1  Feb. 1, 2018

(51) Int. Cl.
  *G09G 5/00* (2006.01)
  *G06T 19/00* (2011.01)
  *G06K 9/00* (2006.01)
  *G06Q 30/06* (2012.01)

(52) U.S. Cl.
  CPC ........ *G06T 19/006* (2013.01); *G06K 9/00362* (2013.01); *G06Q 30/0643* (2013.01); *G06T 2207/30204* (2013.01)

(58) Field of Classification Search
  None
  See application file for complete search history.

(56) References Cited

U.S. PATENT DOCUMENTS

| 2015/0373274 | A1* | 12/2015 | Kuwabara | G06T 19/006 345/633 |
| 2015/0382123 | A1* | 12/2015 | Jobani | H04R 1/1016 700/98 |
| 2017/0287212 | A1* | 10/2017 | Tran | G06T 17/10 |

OTHER PUBLICATIONS

Ivan Sabatell; YouTube Video: "Shoe Deep Configuration for both Web & iPad;" Feb. 13, 2012; p. 1-3, with screenshot Figs. 1-3; https://www.youtube.com/watch?v=StrTfb9uuw4.*
Dembogurski et al.; Interactive Virtual Terrain Generation using Augmented Reality Markers; 2012; SBC Journal on 3D interactive Systems, vol. 3, No. 3; p. 29-36.*
Shoelaceexpress.com; "Shoelace Length Guide;" Oct. 13, 2010; p. 1; https://www.shoelacesexpress.com/popup/shoelaces.htm.*

* cited by examiner

*Primary Examiner* — Peter Hoang (57) ABSTRACT

A method for virtual shoes fitting includes providing two augmented reality (AR) reference papers, each having a plurality of AR markers and a standard size reference object, one reference paper being placed on a ground and the other AR reference paper being placed directly behind and at right angle to the ground; and providing a mobile device having a camera, a processor, and a machine-readable medium with instructions that, when executed, cause the processor to produce AR markers on the mobile device, and automatically taking photos of a user's foot placed on the AR reference paper on the ground together with the standard size reference object. A system for virtual shoes fitting is also disclosed.

14 Claims, 6 Drawing Sheets

METHOD AND SYSTEM FOR VIRTUAL SHOES FITTING

FIELD OF THE TECHNOLOGY

The present application relates to a method and a system for virtual shoes fitting.

BACKGROUND

In the era of O2O purchasing, customers can buy shoes from internet easily. However, due to the differences in various foot measurement standards, customers may find the purchased item not fitting their foot even with the designated size chosen. This incurred unnecessary reshipment, refunding and administration cost in the online footwear industry. The project aims at developing a methodology for virtual shoes fitting, raising the service quality and changing the operation mode of online footwear purchase. Viewing that smart devices has become very common, and their build-in camera are turning more mature with higher resolution, the invention has used smart devices as the medium to capture data for virtual shoes fitting.

SUMMARY

According to one aspect, there is provided a method for virtual shoes fitting including (i) providing two augmented reality (AR) reference papers, each having a plurality of AR markers and a standard size reference object provided thereon, one AR reference paper being placed on a ground and the other AR reference paper being placed directly behind and at right angle with respect to the reference paper on the ground; and (ii) providing a mobile device having an image-capturing unit, a processor, and a machine-readable medium with instructions that, when executed, cause the processor to carry out a plurality of operations comprising producing a plurality of AR markers on a screen of the mobile device.

In one embodiment, the plurality of operations includes automatically taking a plurality of photos of a user's foot placed on the AR reference paper on the ground together with the standard size reference object by the image-capturing unit after (i) an accelerometer in the mobile device detects that the mobile device is parallel to the AR reference paper facing the image-capturing unit, and (ii) the user manually aligns the AR markers on the mobile device with the AR markers on the AR reference paper facing the image-capturing unit.

In one embodiment, the photo taking step includes (i) taking a first photo of a top view of the user's foot, (ii) taking a second photo of an inner side view of the user's foot, (iii) taking a third photo of an outer side view of the user's foot, and (iv) taking a fourth photo of a rear side view of the user's foot. The method for virtual shoes fitting may further include repeating the photo taking steps for the other foot of the user.

The method for virtual shoes fitting further includes scaling the photos to 1:1 by an image processing software.

The method for virtual shoes fitting may further include compensating printing and camera lens errors by measuring a distance between two of the AR markers in the photos and comparing the measured distance with an actual distance between the two AR markers on the AR reference papers.

The method for virtual shoes fitting may further include compensating printing and camera lens errors by measuring a dimension of a marking in the photos and comparing the measured dimension with an actual dimension of the marking on the AR reference papers.

The method for virtual shoes fitting further includes measuring width and length of the foot in the photos.

In one embodiment, the measuring step may include (i) recognizing contour of the foot based on color contrast between the foot and the AR reference papers in the top view photo, and identifying and calculating a maximum width of the foot; and (ii) recognizing contour of the foot based on color contrast between the foot and the AR reference papers in the side view photo, and identifying and calculating a maximum length of the foot.

In one embodiment, the measuring step may include manually picking two points of the foot in the top view photo from which foot width can be measured, and manually picking another two points of the foot in the side view photo from which foot length can be measured.

In one embodiment, the standard size reference object is a coin, the method may further include calculating pixel size and foot width from the coin and the foot in the top view (TV) photo by formulas (1.1) and (1.2):

$$\text{pixel size(in } TV) = \frac{\text{actual diameter of the coin(in mm)}}{\text{number of pixels for diameter(in } TV)} \quad (1.1)$$

$$\text{foot width} = \text{no. of pixels for foot width} * \text{pixel size(in } TV), \quad (1.2)$$

and calculating pixel size and foot length from the coin and the foot in the side view (SV) photo by formulas (1.3) and (1.4):

$$\text{pixel size(in } SV) = \frac{\text{actual diameter of the coin(in mm)}}{\text{number of pixels for diameter(in } SV)} \quad (1.3)$$

$$\text{foot length} = \text{no. of pixels for foot length} * \text{pixel size(in } SV) \quad (1.4)$$

In one embodiment, the standard size reference object is one of the AR markers on the AR reference paper, and foot length is calculated by formulas (1.5), (1.6), (1.7) and (1.4):

$$\text{marker scale(in } TV) = \frac{\text{pixel size(in } TV) * \text{number of pixels for side length(in } TV)}{\text{actual side length}} \quad (1.5)$$

$$\text{marker scale(in } SV) = \frac{\text{pixel size(in } SV) * \text{number of pixels for side length(in } SV)}{\text{actual side length}} \quad (1.6)$$

$$\text{pixel size(in } SV) = \frac{\text{marker scale(in } TV) * \text{actual side length(in } SV)}{\text{number of pixels for side length(in } SV)} \quad (1.7)$$

$$\text{foot length} = \text{no. of pixels for foot length} * \text{pixel size(in } SV), \quad (1.4)$$

wherein the side length is a length of one side of the one of the AR markers (14).

In one embodiment, foot height is calculated by formula (1.8):

foot height=no. of pixels for foot height*pixel size (in SV) (1.8), wherein the foot height is a distance between a point on an instep of the foot and a point on a sole of the foot.

The method for virtual shoes fitting may further include mapping the length and width of the foot in the 2-dimensional photos with 3-dimensional models, and suggesting a plurality of 3-dimensional shoe lasts with width-to-length ratios similar to that of the width and length of the foot for fabrication of shoes.

According to another aspect, there is provided a system for virtual shoes fitting including (i) two augmented reality (AR) reference papers, each having a plurality of AR markers and a standard size reference object provided thereon, one AR reference paper being placed on a ground and the other AR reference paper being placed directly behind and at right angle with respect to the reference paper on the ground; and (ii) a mobile device having an image-capturing unit, a processor, and a machine-readable medium with instructions that, when executed, cause the processor to carry out a plurality of operations comprising producing a plurality of AR markers on a screen of the mobile device.

In one embodiment, the plurality of operations includes automatically taking a plurality of photos of a user's foot placed on the AR reference paper on the ground together with the standard size reference object by the image-capturing unit after (i) an accelerometer in the mobile device detects that the mobile device is parallel to the AR reference paper facing the image-capturing unit, and (ii) the user manually aligns the AR markers on the mobile device with the AR markers on the AR reference paper facing the image-capturing unit.

The system for virtual shoes fitting may further include a cloud to which data from the mobile device is uploaded, and a computer in a back office for retrieving data from the cloud. The computer may include a database in which 3-dimensional models and 3-dimensional shoe lasts are stored. Each shoe last in the database may contain a width-to-length ratio, in which the length counts from a point on the heel to a widest part of the shoe last.

According to a further aspect, there is provided a non-transitory computer-readable media for a mobile device storing executable instructions that, when executed, cause a processor of the mobile device to carry out operations including (a) producing a plurality of augmented reality (AR) markers on a screen of the mobile device by a 2-dimensional graphics software; and (b) automatically taking a plurality of photos of a user's foot together with a standard size reference object provided on an AR reference paper by an image-capturing unit of the mobile device after (i) an accelerometer in the mobile device detects that the mobile device is parallel to the AR reference paper facing the image-capturing unit, and (ii) the user manually aligns the AR markers on the mobile device with a plurality of AR markers on the AR reference paper.

Although the virtual shoes fitting method and system are shown and described with respect to certain embodiments, it is obvious that equivalents and modifications will occur to others skilled in the art upon the reading and understanding of the specification. The virtual shoes fitting method and system in the present application include all such equivalents and modifications, and are limited only by the scope of the claims.

BRIEF DESCRIPTION OF THE DRAWINGS

Specific embodiments of the virtual shoes fitting method and system will now be described by way of example with reference to the accompanying drawings wherein:

FIGS. 5($a$), 5($b$) and 5($c$) show the top view photo, side view photo and rear view photo respectively of a foot according to an embodiment of the present application.

FIGS. 7($a$) and 7($b$) show measurement of foot width from the top view photo and measurement of foot length from the side view photo respectively according to an embodiment of the present application.

DETAILED DESCRIPTION

Reference will now be made in detail to a preferred embodiment of the virtual shoes fitting method and system, examples of which are also provided in the following description. Exemplary embodiments of the virtual shoes fitting method and system are described in detail, although it will be apparent to those skilled in the relevant art that some features that are not particularly important to an understanding of the virtual shoes fitting method and system may not be shown for the sake of clarity.

Furthermore, it should be understood that the virtual shoes fitting method and system are not limited to the precise embodiments described below and that various changes and modifications thereof may be effected by one skilled in the art without departing from the scope of the protection.

In addition, improvements and modifications which may become apparent to persons of ordinary skill in the art after reading this disclosure, the drawings, and the appended claims are deemed within the scope of the protection.

Figure 1:
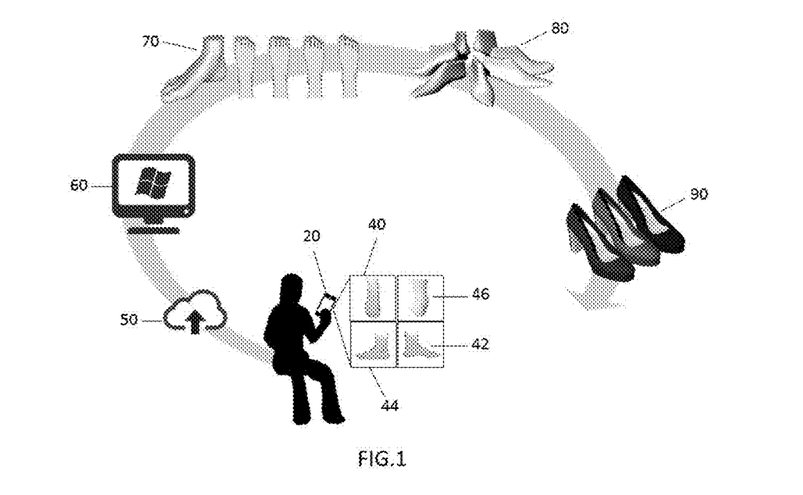
FIG. 1 is a flow diagram of a virtual shoes fitting process according to an embodiment of the present application.

FIG. 1 is a flow diagram of a virtual shoes fitting process according to an embodiment of the present application. First, a customer or user would need to download an application for virtual shoes fitting on his/her smart or mobile device 20 and print out two designed Augmented Reality (AR) reference papers 10, 12. Each of the AR reference paper 10, 12 may have a plurality of AR markers 14 and a standard size reference object 18 provided thereon. The virtual shoes fitting application is able to recognize and communicate with the designed AR reference papers 10, 12 through a plurality of AR markers 14 on the AR reference papers 10, 12.

Figure 2:
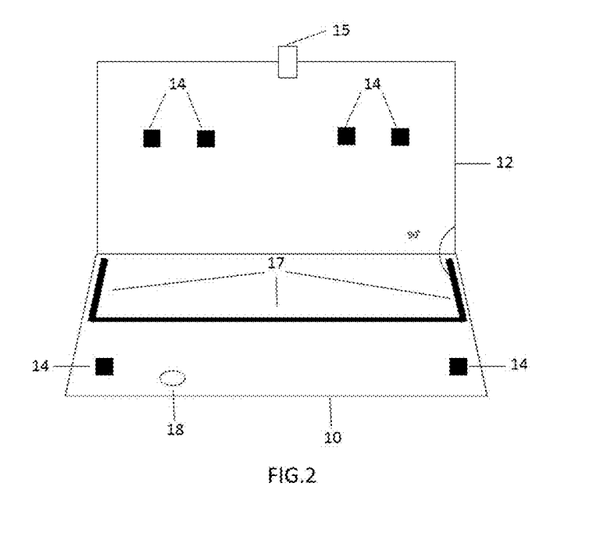
FIG. 2 is an illustrative diagram showing placement and orientation of two AR reference papers.

The user can either place a coin 18 (a standard size reference object) on each AR reference paper 10, 12, or measure and mark down the length of a marking 16 on the AR reference papers 10, 12 to facilitate determination and compensation of printing and camera lens errors.

The user may then follow the instructions in the virtual shoes fitting application, stick one of the AR reference paper 10 on the ground, and stick the other one of the AR reference paper 12 directly behind and at right angle with respect to the reference paper 10 on the ground by a tape 15, as shown in FIG. 2. The AR reference papers 10, 12 can provide a standardized box environment for capturing foot measurement data at a very low cost.

Figure 3:
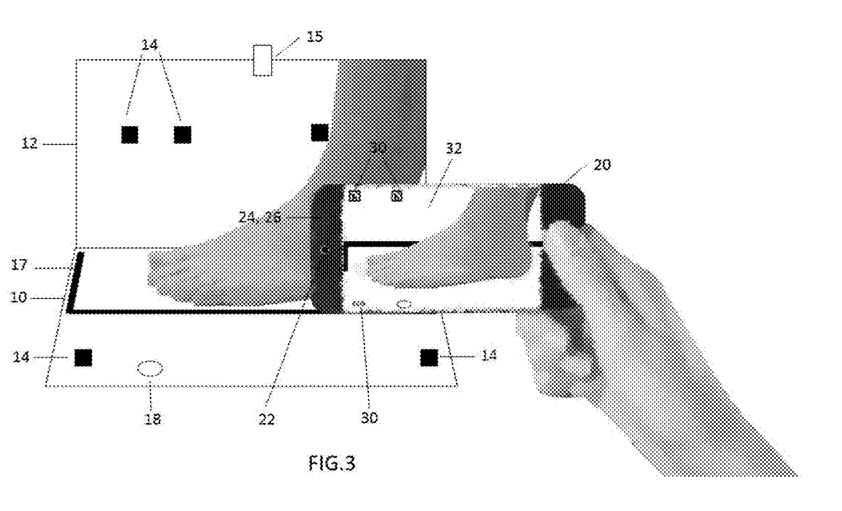
FIG. 3 is an illustrative diagram of a foot photo taking process.

The user may then place his/her foot of the AR reference paper 10 on the ground with the aid of a plurality of foot-aligning lines 17 and may take four quality standard photos 40, 42, 44, 46 for each foot by a camera or an image-capturing unit 22 of the mobile device 20, as illustrated in FIG. 3. As shown in FIG. 1, the first photo 40 can be a top view of the user's foot, the second photo 42 can be an inner side view of the user's foot, the third photo 44 can be an outer side view of the user's foot, and the fourth photo 46 can be a rear side view of the user's foot.

Figure 4:
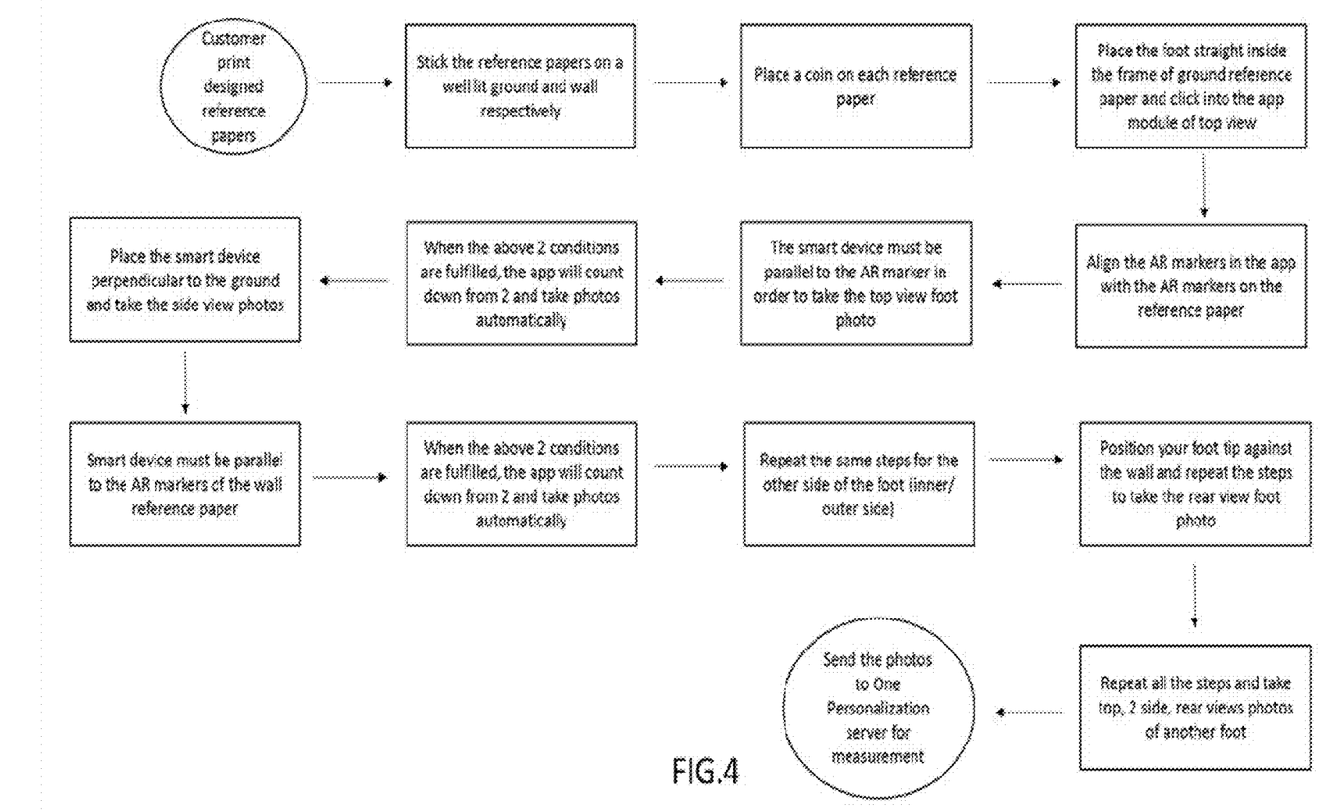
FIG. 4 is a flowchart of a customer's operation in the virtual shoes fitting process according to an embodiment of the present application.
Figure 5A:
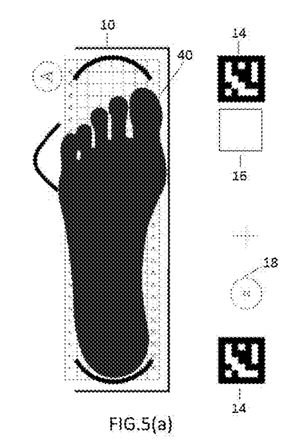
Figure 5B:
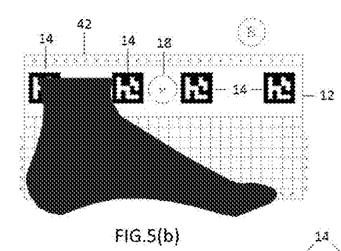
Figure 5C:
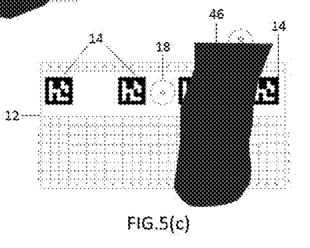

FIG. 4 shows a flowchart of a user's operation in the virtual shoes fitting process according to an embodiment of the present application. FIGS. 5(a), 5(b) and 5(c) show the top view photo 40, side view photo 42 and rear view photo 46 respectively of the foot.

After photo taking, the photos 40, 42, 44, 46 can be uploaded to a cloud 50 or a back office server. A computer 60 in a back office can retrieve data from the cloud 50. The computer 60 may include a database in which 3-dimensional (3D) models 70 and 3-dimensional shoe lasts 80 can be stored.

The uploaded photos 40, 42, 44, 46 can be used for foot measurement (virtual fitting) either by an image-processing method or a point-picking method. Two main measurements, namely the length and width of the foot, can be obtained from the photos 40, 42, 44, 46. Defined measurements can be forwarded to the 3D model and shoe last database for parameter's comparison. The suitable shoe lasts will be filtered out and suggested some shoe styles for customers. The back office can send push notification and inform the user through the virtual shoes fitting application when the measurements and suggested shoe styles are ready. If the user makes a purchase on the internet, a shoes maker will fabricate a pair of customized shoes 90 for the user according to the chosen shoe last and foot features shown in the photos 40, 42, 44 46. Finally, the customized shoes 90 will be shipped to the user.

In the flow of virtual shoes fitting process, few technical issues will need to be taken into account.

1. Develop Algorithm for Data Capturing with Mobile Device

The photos 40, 42, 44, 46 taken by the mobile device 20 should not be distorted, tilted or blurred because that will affect measurement and calculation in the back office. Compensation of wide angle lens of different mobile devices will also be taken into account. The algorithm developed can ensure that the photos 40, 42, 44, 46 taken can be of standard quality for back office application to process and calculate foot measurements. The algorithm and logic can be diffused in the interaction of the designed reference papers 10, 12 and the mobile device application.

When a user starts to take photos of the foot, an accelerometer 26 of the mobile device 20 can be called out. The accelerometer 26 can detect and ensure that the mobile device 20 is completely parallel to the AR reference paper 10, 12 facing the image-capturing unit 22 without tilting. The user may then have to move the mobile device 20, and manually overlap or align a plurality of AR markers 30 produced on a screen 32 on the mobile device 20 with the AR markers 14 on the AR reference paper 10, 12 facing the image-capturing unit 22.

Upon successful aligning of the AR markers 14 30, the virtual shoes fitting application can count down and take standard photo of the foot automatically. The same principle applied for taking photos of the foot for all views (i.e. top, inner side, outer side, and rear views) of the foot.

The top view photo 40 can aid to find the width of the foot, while the inner side photo 42 can help to determine the length of the foot. All photos 40, 42, 44, 46 may be taken to determine the shapes and dimensions of the foot that are necessary for shoes fabrication.

The AR marker 14 is a pattern for the app program to recognize and decode the action to be taken. The AR marker 14 can be produced by a 2D graphics software, and import into AR engine for programming the action required. In the present embodiment, Vuforia and Unity are used.

The system for virtual shoes fitting of the present application includes a non-transitory computer-readable media on the mobile device 20 for storing executable instructions that, when executed, cause a processor 24 of the mobile device 20 to carry out operations including (a) producing a plurality of the AR markers 30 on the screen 32 of the mobile device 20 by a 2-dimensional graphics software; and (b) automatically taking the photos 40, 42, 44, 46 of the user's foot together with the standard size reference object 18 provided on the AR reference paper 10, 12 by the image-capturing unit 22 after (i) the accelerometer 26 in the mobile device 20 detects that the mobile device 20 is parallel to the AR reference paper 10, 12 facing the image-capturing unit 22, and (ii) the user manually aligns the AR markers 30 on the mobile device 20 with the AR markers 14 on the AR reference paper 10, 12.

2. Develop Algorithm to Scale the Foot Photos to 1:1

Many scaling factors need to be taken into account to calculate foot measurements accurately. These factors may include printing scaling error from different computers/printers, photo scaling issues derived from different mobile devices, and focal factors within the same photo. Yet, these factors are uncontrollable due to variations in smart devices and printers. Therefore, the standard size reference object 18 is needed to be placed on the AR reference papers 10, 12 to determine the combined effect/error of these factors. There are two methods for standardization:

i) Place a Coin on the AR Reference Paper

The coin 18 has a standard size and its dimension will not be distorted. When the photos 40, 42, 44, 46 are sent to the back office, an image processing software can compute the pixel size of the coin 18 in the photos 40, 42, 44, 46, and calculate the actual foot width and length by scaling and proportion. The combined error factor hence may be obtained by calculating a dimension of an AR marker 14 or the distance between two AR markers 14 in the photos 40, 42, 44, 46, follow by comparing the measured dimension and actual dimension of the AR marker 14 or the measured distance with the actual distance between the two AR markers 14 on the AR reference papers 10, 12. The combined error factor will be regarded as compensation when scaling the inner, outer and rear view photos 42, 44, 46.

ii) Take the Dimension of the AR Reference Paper's Marking

The combined error factor can also be obtained by measuring a dimension of a marking (16) in the photos (40, 42, 44, 46) and comparing the measured dimension with an actual dimension of the marking (16) on the AR reference papers (10, 12). The user may be asked to use a ruler to measure the actual distance between two AR markers 14 on the AR reference paper 10, 12 and mark it down on the reference paper 10, 12 before taking photos. In the back office, an operator can compare measured distance and the actual distance between the AR markers 14. The combined error factor can hence be defined and used as compensation when conducting calculation on the inner, outer and rear view photos 42, 44, 46.

3. Develop Algorithm to Measure Foot's Length and Width with 2D Photos

There are two methods for measuring the true width and length of foot with the scaled photos 40, 42, 44, 46:

i) Image Processing

The foot width can be obtained from the top view photo 40 by (i) recognizing the contour of the foot based on color contrast between the foot and the AR reference papers 10, 12 in the top view photo 40, and identifying and calculating a maximum width of the foot; and (ii) recognizing the contour of the foot based on color contrast between the foot and the AR reference papers 10, 12 in the side view photo 42, 44, and identifying and calculating a maximum length of the foot by software.

ii) Point Picking

Some customers with very large foot may face a situation where the foot length exceeds the length of the AR reference paper 10, 12. In this situation, interference of the background of the floor on which the AR reference paper 10 is placed may obstruct the image processing method and make it fail to define the complete foot's contour. Hence, a manual method of point picking is needed to identify the two ends of the foot. The user may manually pick two points of the foot in the top view photo 40 from which the foot width can be measured, and manually pick another two points of the foot in the side view photo 42, 44 from which the foot length can be measured by software.

4. Develop Algorithm for 3D Foot Model Mapping

With the true 2D foot length and width calculated, the 2D data can be converted into useful 3D data that are able to put into production. The algorithm can be developed to map the 2D data with 3D foot model (shoe last) for shoe design and fabrication.

5. Choosing Shoe Last by Width-to-Length Ratio

Figure 6:
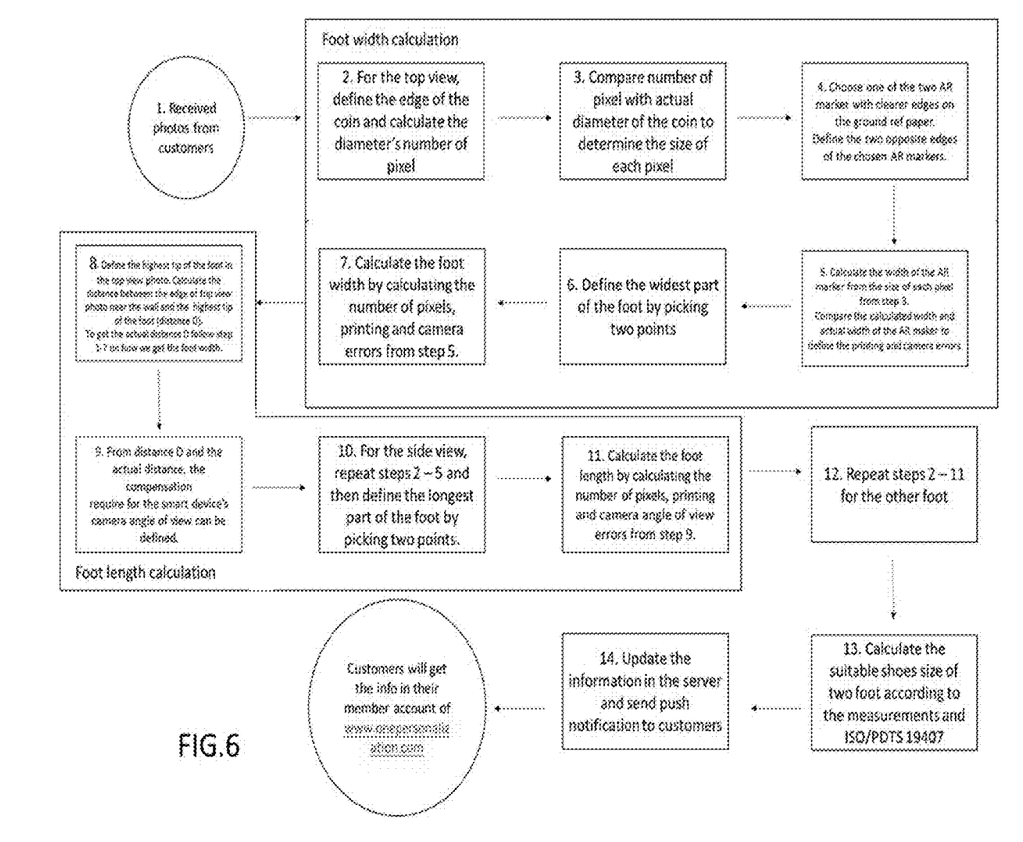
FIG. 6 is a flowchart of operator measurement procedures of the virtual shoes fitting according to an embodiment of the present application.
Figure 7A:
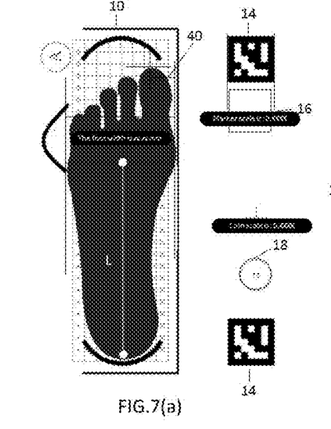
Figure 7B:
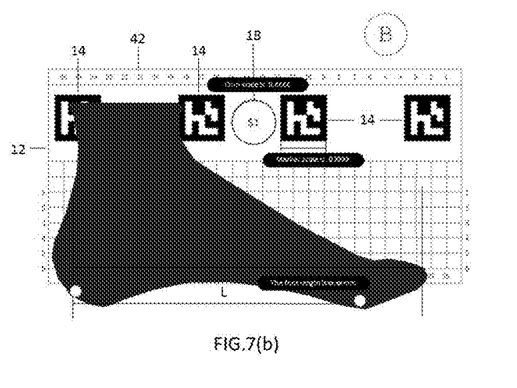

The software at the back office may contain a shoe last database with 100 data and this number can be increased in the future and the software can still handle. The software would compare the user's and the shoe lasts' dimensions and determine which shoe lasts, hence shoe styles, are suitable for the user. Each shoe last 80 in the database may contain a width-to-length ratio, in which the length L may count from a point on the heel to the widest part of the shoe last 80. The same width-to-length ratio can be obtained from the photos 40, 42, 44 in which the length L may count from a point on the heel of the user's foot to the widest part of the foot as denoted in the top view photo 40. The software can sort out the shoe lasts 80 with width-to-length ratios which are similar to the width-to-length ratio of the user's foot and suggest some suitable shoe styles accordingly. The mechanism is also suitable for shoe styles that are pointed or toe parts that are not fully filled FIG. 6 is a flowchart of operator measurement procedures of the virtual shoes fitting according to an embodiment of the present application. FIGS. 7(*a*) and 7(*b*) show measurement of foot width from the top view photo 40 and measurement of foot length from the side view photo 42 respectively according to an embodiment of the present application.

The general idea of measurement is to confirm the pixel size in the photo and calculate the pixel number of the foot width and length. As the pixel size is different in different photos, it should be calculated every time when a new photo is taken.

For Measuring Foot Width:

In the top view (TV) photo 40, the coin 18 can be taken as a reference dimension to calculate the pixel size. The actual diameter of the coin 18 is standard. After obtaining the number of pixels that represents the diameter of the coin 18 in the photo 40, the pixel size can be calculated by following formula:

$$\text{pixel size(in } TV) = \frac{\text{actual diameter of the coin(in mm)}}{\text{number of pixels for diameter(in } TV)} \quad (1.1)$$

The width of the foot can be calculated by formula (1.2) after getting its pixel number in the same photo:

$$\text{foot width} = \text{no. of pixels for foot width} * \text{pixel size(in TV)} \quad (1.2)$$

For measuring foot length:

In the side view (SV) photo 42, 44, there is also a reference coin 18 for calculating the pixel size. Repeat the same procedure to get the pixel size in side view photo 42, 44:

$$\text{pixel size(in } SV) = \frac{\text{actual diameter of the coin(in mm)}}{\text{number of pixels for diameter(in } SV)} \quad (1.3)$$

The length of the foot can be calculated by the following formula (1.4):

$$\text{foot length} = \text{no. of pixels for foot length} * \text{pixel size (in SV)} \quad (1.4)$$

There is another way for measuring foot length, in case a coin is not used or the quality of the photos are not good enough to use the calculation of formula 1.3, 1.4.

Actually, there exists printing and camera errors, both of which are combined in the photos and considered as constant for one user. According to this concept, the pixel size in the photo of the side view of the foot can be calculated without the reference coin 18 in side view by using parameters from the top view.

After knowing the pixel size in the photo of the top view, calculate the side length of the AR marker in the same photo and compare with the actual side length of the AR marker to get a scale (i.e. marker scale). This scale should be the same in the photos taken by one user:

$$\text{marker scale(in } TV) = \frac{\text{pixel size(in } TV) * \text{number of pixels for side length(in } TV)}{\text{(actual side length)}} \quad (1.5)$$

In the photo of side view, a similar equation can be constructed:

$$\text{marker scale(in } SV) = \frac{\text{pixel size(in } SV) * \text{number of pixels for side length(in } SV)}{\text{actual side length}} \quad (1.6)$$

Rearranging terms in 1.6 and substituting marker scale (in TV) for marker scale (in SV), one can get:

$$\text{pixel size(in } SV) = \frac{\text{marker scale(in } TV) * \text{actual side length(in } SV)}{\text{number of pixels for side length(in } SV)} \quad (1.7)$$

The length of the foot can be calculated same as equation 1.4:

$$\text{foot length} = \text{no. of pixels for foot length} * \text{pixel size (in SV)} \quad (1.4)$$

Calculating Foot Height:

As the pixel size in side view is calculated, the height of the foot can be easily calculated by picking one point on the sole of the foot and another point on the instep of the foot:

$$\text{foot height} = \text{no. of pixels for foot height} * \text{pixel size (in SV)} \quad (1.8)$$

Compensation in calculating with photo of side view:

When taking the side view photo 42, 44, it is obviously that the foot is nearer the camera 22 than the AR marker 14 or the reference coin 18 on the AR reference paper 12. As everything looks smaller at a farther distance and bigger at a nearer distance, a compensated parameter can be added in order to calculate a proper pixel size in the same distance of the foot. This is a test based process by placing an additional reference paper at different distances from the camera 22, calculating the pixel size at different distances, and obtaining the parameter to present the relationship between the distance and the pixel size in the side view.

The virtual shoes fitting system of the present application allows customers to provide foot measurement online and the customers do not need to visit the shops. The customers' foot measurement will match with the shoe lasts build-in the system and can be stored online rather than recorded on paper.

The virtual shoes fitting system of the present application will have commercial application for companies which are currently selling shoes offline or online. If they are currently selling shoes online, they can use the virtual shoes fitting system of the present application for their customers to provide accurate foot measurement before customers place orders. If they are currently selling shoes offline, they can join the online platform and join other online shoe retailers. While the total number of people wearing shoes will not be affected by the virtual shoes fitting system of the present application, the number of shoes ordered online by each person with the virtual shoes fitting system of the present application will be increased.

Furthermore, customer satisfaction will be higher than before. The foot measurement by mobile apps is user-friendly and convenient. Customers can take their own foot measurement at everywhere and at anytime. With the mobile apps of the virtual shoes fitting system of the present application, customer can choose, mix and match so as to create a pair of great looking shoes that fit them and are comfortable to wear rather than being forced to take the shoes inventory manufactured by mass production. There will be less wastage of shoes when customers find out that their shoes are not fitting their feet after purchasing. On the finance aspect, manufacturers do not need to guess the feet size of customers and build up stock, and thus will decrease the wastage level and be more environmental friendly from the shoes manufacturing's initial stage.

While it is difficult to quantify the commercial values of all these benefits in dollar term, the shoe industry will benefit from the virtual shoes fitting system of the present application. The marketability of the virtual shoes fitting system of the present application is high, because people are used to downloading Apps in Apple IOS or Google Android stores. Downloading and using the Apps may be free in the initial launch period to encourage more people to use it, and browse the online platform, www.OnePersonalization.com to look for shoes to fit the foot measurements. Such platform can be used by many shoe companies and benefit the whole industry. When more customers go to the platform, it will attract more shoe companies to join the platform. This two-sided platform for customers and shoe makers in effect will be a very effective marketing and selling platform to allow matching of demand and supply online. Lastly, with the increasing client information, it helps to build up a central database and shoe makers can use these huge data for future analysis (such as on age group, demographic, education and income level etc) of the shoes industry.

While the virtual shoes fitting method and system have been shown and described with particular references to a number of preferred embodiments thereof, it should be noted that various other changes or modifications may be made without departing from the scope of the appended claims.

What is claimed is:

1. A method for virtual shoes fitting comprising:
   (a) providing two augmented reality (AR) reference papers (10, 12), each having a plurality of AR markers (14) and a standard size reference object (18) provided thereon, one AR reference paper (10) being placed on a ground and the other AR reference paper (12) being placed directly behind and at right angle with respect to the reference paper (10) on the ground; and
   (b) providing a mobile device (20) comprising an image-capturing unit (22), a processor (24), and a machine-readable medium with instructions that, when executed, cause the processor (24) to carry out a plurality of operations comprising producing a plurality of AR markers (30) on a screen (32) of the mobile device (20);
   wherein the plurality of operations comprises automatically taking a plurality of photos (40, 42, 44, 46) of a user's foot placed on the AR reference paper (10) on the ground together with the standard size reference object (18) by the image-capturing unit (22) after (i) an accelerometer (26) in the mobile device (20) detects that the mobile device (20) is parallel to the AR reference paper (10, 12) facing the image-capturing unit (22), and (ii) the user manually aligns the AR markers (30) on the mobile device (20) with the AR markers (14) on the AR reference paper (10, 12) facing the image-capturing unit (22);
   wherein the photo taking step comprises (i) taking a first photo (40) of a top view of the user's foot, (ii) taking a second photo (42) of an inner side view of the user's foot, (iii) taking a third photo (44) of an outer side view of the user's foot, and (iv) taking a fourth photo (46) of a rear side view of the user's foot;
   the method further comprises scaling the photos (40, 42, 44, 46) to 1:1 by an image processing software; and measuring width and length of the foot in the photos (40, 42, 44, 46);
   wherein the measuring step comprises (i) recognizing contour of the foot based on color contrast between the foot and the AR reference papers (10, 12) in the top view photo (40), and identifying and calculating a maximum width of the foot; and (ii) recognizing contour of the foot based on color contrast between the foot and the AR reference papers (10, 12) in the side view photo (42, 44), and identifying and calculating a maximum length of the foot.

2. The method for virtual shoes fitting as claimed in claim 1, further comprising repeating the photo taking steps for the other foot of the user.

3. The method for virtual shoes fitting as claimed in claim 1, further comprising compensating printing and camera lens errors by measuring a distance between two of the AR markers (14) in the photos (40, 42, 44, 46) and comparing the measured distance with an actual distance between the two AR markers (14) on the AR reference papers (10, 12).

4. The method for virtual shoes fitting as claimed in claim 1, further comprising compensating printing and camera lens errors by measuring a dimension of a marking (16) in the photos (40, 42, 44, 46) and comparing the measured dimension with an actual dimension of the marking (16) on the AR reference papers (10, 12).

5. The method for virtual shoes fitting as claimed in claim 1, wherein the measuring step comprises manually picking two points of the foot in the top view photo (40) from which foot width can be measured, and manually picking another two points of the foot in the side view photo (42, 44) from which foot length can be measured.

6. The method for virtual shoes fitting as claimed in claim 1, wherein the standard size reference object is a coin (18), and further comprising calculating pixel size and foot width from the coin (18) and the foot in the top view (TV) photo (40) by formulas (1.1) and (1.2):

$$\text{pixel size(in } TV) = \frac{\text{actual diameter of the coin(in mm)}}{\text{number of pixels for diameter(in } TV)} \quad (1.1)$$

$$\text{foot width} = \text{no. of pixels for foot width} * \text{pixel size(in } TV), \quad (1.2)$$

and calculating pixel size and foot length from the coin (18) and the foot in the side view (SV) photo (42, 44) by formulas (1.3) and (1.4):

$$\text{pixel size(in } SV) = \frac{\text{actual diameter of the coin(in mm)}}{\text{number of pixels for diameter(in } SV)} \quad (1.3)$$

$$\text{foot length} = \text{no. of pixels for foot length} * \text{pixel size(in } SV). \quad (1.4)$$

7. The method for virtual shoes fitting as claimed in claim 1, wherein the standard size reference object is one of the AR markers (14) on the AR reference paper (10, 12), and foot length is calculated by formulas (1.5), (1.6), (1.7) and (1.4):

$$\text{marker scale(in } TV) = \frac{\text{pixel size(in } TV) * \text{number of pixels for side length(in } TV)}{\text{actual side length}} \quad (1.5)$$

$$\text{marker scale(in } SV) = \frac{\text{pixel size(in } SV) * \text{number of pixels for side length(in } SV)}{\text{actual side length}} \quad (1.6)$$

$$\text{pixel size(in } SV) = \frac{\text{marker scale(in } TV) * \text{actual side length(in } SV)}{\text{number of pixels for side length(in } SV)} \quad (1.7)$$

$$\text{foot length} = \text{no. of pixels for foot length} * \text{pixel size(in } SV), \quad (1.4)$$

wherein the side length is a length of one side of the one of the AR markers (14).

8. The method for virtual shoes fitting as claimed in claim 6, wherein foot height is calculated by formula (1.8):

$$\text{foot height} = \text{no. of pixels for foot height} * \text{pixel size (in } SV), \quad (1.8)$$

wherein the foot height is a distance between a point on an instep of the foot and a point on a sole of the foot.

9. The method for virtual shoes fitting as claimed in claim 1, further comprising mapping the length and width of the foot in the 2-dimensional photos (40, 42, 44, 46) with 3-dimensional foot models (70), and suggesting a plurality of 3-dimensional shoe lasts (80) with width-to-length ratios similar to that of the width and length of the foot for fabrication of shoes (90).

10. A system for virtual shoes fitting comprising:
(a) two augmented reality (AR) reference papers (10, 12), each having a plurality of AR markers (14) and a standard size reference object (18) provided thereon, one AR reference paper (10) being placed on a ground and the other AR reference paper (12) being placed directly behind and at right angle with respect to the reference paper (10) on the ground; and
(b) a mobile device (20) comprising an image-capturing unit (22), a processor (24), and a machine-readable medium with instructions that, when executed, cause the processor (24) to carry out a plurality of operations comprising producing a plurality of AR markers (30) on a screen (32) of the mobile device (20);
wherein the plurality of operations comprises automatically taking a plurality of photos (40, 42, 44, 46) of a user's foot placed on the AR reference paper (10) on the ground together with the standard size reference object (18) by the image-capturing unit (22) after (i) an accelerometer (26) in the mobile device (20) detects that the mobile device (20) is parallel to the AR reference paper (10, 12) facing the image-capturing unit (22), and (ii) the user manually aligns the AR markers (30) on the mobile device (20) with the AR markers (14) on the AR reference paper (10, 12) facing the image-capturing unit (22);
wherein the photo taking step comprises (i) taking a first photo (40) of a top view of the user's foot, (ii) taking a second photo (42) of an inner side view of the user's foot, (iii) taking a third photo (44) of an outer side view of the user's foot, and (iv) taking a fourth photo (46) of a rear side view of the user's foot;
the instructions, when executed, further cause the processor (24) to scale the photos (40, 42, 44, 46) to 1:1 by an image processing software and measure width and length of the foot in the photos (40, 42, 44, 46);
wherein the measuring process comprises (i) recognizing contour of the foot based on color contrast between the foot and the AR reference papers (10, 12) in the top view photo (40), and identifying and calculating a maximum width of the foot; and (ii) recognizing contour of the foot based on color contrast between the foot and the AR reference papers (10, 12) in the side view photo (42, 44), and identifying and calculating a maximum length of the foot.

11. The system for virtual shoes fitting as claimed in claim 10, further comprising a cloud (50) to which data from the mobile device (20) is uploaded, and a computer (60) in a back office for retrieving data from the cloud (50).

12. The system for virtual shoes fitting as claimed in claim 11, wherein the computer (60) comprises a database in which 3-dimensional foot models (70) and 3-dimensional shoe lasts (80) are stored.

13. The system for virtual shoes fitting as claimed in claim 12, wherein each shoe last (80) in the database contains a width-to-length ratio, in which the length (L) counts from a point on a heel to a widest part of the shoe last (80).

14. A non-transitory computer-readable media for a mobile device (20) storing executable instructions that, when executed, cause a processor (24) of the mobile device (20) to carry out operations comprising:
   (a) producing a plurality of augmented reality (AR) markers (30) on a screen (32) of the mobile device (20) by a 2-dimensional graphics software; and
   (b) automatically taking a plurality of photos (40, 42, 44, 46) of a user's foot together with a standard size reference object (18) provided on an AR reference paper (10, 12) by an image-capturing unit (22) of the mobile device (20) after (i) an accelerometer (26) in the mobile device (20) detects that the mobile device (20) is parallel to the AR reference paper (10, 12) facing the image-capturing unit (22), and (ii) the user manually aligns the AR markers (30) on the mobile device (20) with a plurality of AR markers (14) on the AR reference paper (10, 12);
   wherein the plurality of operations comprises automatically taking a plurality of photos (40, 42, 44, 46) of a user's foot placed on the AR reference paper (10) on the ground together with the standard size reference object (18) by the image-capturing unit (22) after (i) an accelerometer (26) in the mobile device (20) detects that the mobile device (20) is parallel to the AR reference paper (10, 12) facing the image-capturing unit (22), and (ii) the user manually aligns the AR markers (30) on the mobile device (20) with the AR markers (14) on the AR reference paper (10, 12) facing the image-capturing unit (22);
   wherein the photo taking step comprises (i) taking a first photo (40) of a top view of the user's foot, (ii) taking a second photo (42) of an inner side view of the user's foot, (iii) taking a third photo (44) of an outer side view of the user's foot, and (iv) taking a fourth photo (46) of a rear side view of the user's foot;
   the instructions, when executed, further cause the processor (24) to scale the photos (40, 42, 44, 46) to 1:1 by an image processing software and measure width and length of the foot in the photos (40, 42, 44, 46);
   wherein the measuring process comprises (i) recognizing contour of the foot based on color contrast between the foot and the AR reference papers (10, 12) in the top view photo (40), and identifying and calculating a maximum width of the foot; and (ii) recognizing contour of the foot based on color contrast between the foot and the AR reference papers (10, 12) in the side view photo (42, 44), and identifying and calculating a maximum length of the foot.

* * * * *